US011976509B1

(12) United States Patent
Mazur et al.

(10) Patent No.: US 11,976,509 B1
(45) Date of Patent: May 7, 2024

(54) SIMULATED STEEL FENESTRATION SYSTEM

(71) Applicant: PGT Innovations, Inc., North Venice, FL (US)

(72) Inventors: Richard Mazur, Mesa, AZ (US); Cameron Miles Wyatt, Gilbert, AZ (US); Jennifer Lloyd-Randolfi, Chandler, AZ (US)

(73) Assignee: PGT Innovations, LLC, Harrisburg, PA (US)

( * ) Notice: Subject to any disclaimer, the term of this patent is extended or adjusted under 35 U.S.C. 154(b) by 0 days.

(21) Appl. No.: 17/495,591

(22) Filed: Oct. 6, 2021

Related U.S. Application Data

(62) Division of application No. 16/752,538, filed on Jan. 24, 2020, now Pat. No. 11,739,585.

(60) Provisional application No. 62/802,507, filed on Feb. 7, 2019.

(51) Int. Cl.
*E06B 3/263* (2006.01)
*E06B 3/16* (2006.01)

(52) U.S. Cl.
CPC ............ *E06B 3/26305* (2013.01); *E06B 3/16* (2013.01); *E06B 2003/26352* (2013.01); *E06B 2003/26398* (2013.01)

(58) Field of Classification Search
CPC .................. E06B 3/26305; E06B 3/16; E06B 2003/26352; E06B 2003/26398
See application file for complete search history.

(56) References Cited

U.S. PATENT DOCUMENTS

| | | | | |
|---|---|---|---|---|
| 2,240,591 A | | 5/1941 | Waterman | |
| 3,093,217 A | * | 6/1963 | Doede | E06B 3/26305 52/235 |
| 3,221,453 A | * | 12/1965 | Lietaert | E04B 2/965 52/235 |
| 3,307,316 A | ‡ | 3/1967 | Gray | E06B 3/685 D25/48.8 |
| 3,308,593 A | | 3/1967 | Smith | |
| 4,060,950 A | ‡ | 12/1977 | Rackard | E06B 3/685 52/456 |
| 4,145,858 A | ‡ | 3/1979 | Dovman | E06B 3/6604 52/456 |

(Continued)

FOREIGN PATENT DOCUMENTS

| | | | | |
|---|---|---|---|---|
| BE | 1021232 B1 | * | 8/2015 | E06B 1/18 |
| GB | 1564447 | | 4/1980 | |
| GB | 2039783 | ‡ | 5/1995 | |

OTHER PUBLICATIONS

MJ Windows https://www.mjwindows.ca/products/grids-muntin-bars/ Sep. 4, 2018 (Year: 2018), 1 pg.‡

(Continued)

*Primary Examiner* — Brian D Mattei
*Assistant Examiner* — Omar F Hijaz
(74) *Attorney, Agent, or Firm* — Snell & Wilmer L.L.P.

(57) ABSTRACT

An insulated fenestration system includes a frame comprising a first bracket, the first bracket defining a sealing slot; a pane assembly assembled with the frame, the pane assembly comprising a first pane; a bracket gap defined between the first bracket and the first pane; and a first seal engaging the sealing slot, the first seal extending across the bracket gap and abutting the first pane.

20 Claims, 6 Drawing Sheets

(56) References Cited

U.S. PATENT DOCUMENTS

| | | | | |
|---|---|---|---|---|
| D256,729 | S | 9/1980 | Carlson | |
| 4,437,284 | A | 3/1984 | Cribben et al. | |
| 4,598,520 | A ‡ | 7/1986 | Ellstrom | E06B 3/685 52/314 |
| 4,640,078 | A * | 2/1987 | Haffer | E06B 3/222 52/656.5 |
| 4,678,487 | A | 7/1987 | Cadwell, Jr. et al. | |
| 4,907,389 | A ‡ | 3/1990 | Pettit | E04C 2/423 52/748.1 |
| 5,040,347 | A | 8/1991 | Valvis | |
| 5,088,255 | A * | 2/1992 | Emanuel | E06B 3/5842 52/456 |
| 5,274,976 | A | 1/1994 | Burkhart | |
| 5,331,727 | A | 7/1994 | Golen | |
| D361,134 | S | 8/1995 | Bischel | |
| D361,135 | S | 8/1995 | Bischel | |
| D361,387 | S | 8/1995 | Bischel | |
| D361,388 | S | 8/1995 | Bischel | |
| D361,389 | S | 8/1995 | Bischel | |
| 5,617,684 | A ‡ | 4/1997 | Sheath | E06B 3/68 52/204.57 |
| 6,035,597 | A ‡ | 3/2000 | Donaldson | E06B 3/685 52/456 |
| 6,708,384 | B2 ‡ | 3/2004 | McGlinchy | E06B 3/667 72/181 |
| D495,063 | S | 8/2004 | Barnard | |
| D498,306 | S ‡ | 11/2004 | Chaussy, Jr. | D25/48.7 |
| 6,898,914 | B2 | 5/2005 | Folsom et al. | |
| 7,464,514 | B2 ‡ | 12/2008 | Hanggli | E06B 3/6604 24/297 |
| 7,716,885 | B2 ‡ | 5/2010 | Reichert | E06B 3/6675 49/501 |
| 8,112,941 | B2 * | 2/2012 | Lenox | E06B 3/26303 49/176 |
| D668,784 | S | 10/2012 | Myles | |
| D700,359 | S | 2/2014 | Elizarraras et al. | |
| D710,027 | S | 7/2014 | Myles | |
| D710,029 | S | 7/2014 | Myles | |
| 9,441,412 | B1 * | 9/2016 | Hooper, Jr. | E06B 3/26301 |
| D793,580 | S | 8/2017 | Staton | |
| D799,719 | S | 10/2017 | Staton | |
| 10,415,302 | B2 ‡ | 9/2019 | Vander Bent, Jr. | E06B 3/5835 |
| 10,550,626 | B1 | 2/2020 | Medina et al. | |
| D902,023 | S ‡ | 11/2020 | Briese | D8/394 |
| D927,017 | S | 8/2021 | Mazur et al. | |
| D952,906 | S | 5/2022 | Mazur et al. | |
| D953,577 | S | 5/2022 | Mazur et al. | |
| 2001/0034990 | A1 ‡ | 11/2001 | Reichert | E06B 3/667 52/456 |
| 2003/0159374 | A1 * | 8/2003 | Burgess | E06B 3/685 52/456 |
| 2004/0216402 | A1 * | 11/2004 | Folsom | E06B 3/685 52/204.59 |
| 2009/0313922 | A1 ‡ | 12/2009 | Yun | E06B 7/14 52/209 |
| 2012/0214397 | A1 * | 8/2012 | Strycharske | E06B 3/26347 454/195 |
| 2016/0102492 | A1 | 4/2016 | Cai | |
| 2019/0264491 | A1 * | 8/2019 | McKenna | E06B 3/26 |
| 2020/0370361 | A1 ‡ | 11/2020 | Zehner | E06B 3/67373 |

OTHER PUBLICATIONS

Mazur, Richard; Non-Final Office Action for Design U.S. Appl. No. 29/796,650, filed Jun. 25, 2021, dated Dec. 29, 2021, 16 pgs.‡

Vinyl Windows Signature Elite Vinyl Replacement Windows—Gentek https://gentekinc.com/product-catalog/windows/signature-elite-vinyl-windows/ Sep. 2020 (Year: 2020), 4 pgs.‡

Olympia Windows and Doors https://www.olympiawindows.com/doors/ May 2016 (Year: 2016), 1 pg.‡

San Diego Replacement Window Grids_ BM Windows https://www.bmwindowsca.com/grid-options-san-diego-replacement-window-customers Jun. 2016 (Year: 2016), 3 pgs.‡

Mazur, Richard; Corrected Notice of Allowance for U.S. Appl. No. 29/796,649, filed Jun. 25, 2021, dated Feb. 9, 2022, 9 pgs.‡

Fancy Windows https://www.fancywindows.com/picture-windows.html Jul. 1, 2019 (Year: 2019), 2 pgs.‡

Mazur, Richard; Notice of Allowance for U.S. Appl. No. 29/796,649, filed Jun. 25, 2021, dated Jan. 10, 2022, 14 pgs.‡

M2M triangle tubes http://www.m2m-alu.com/en/tube-triangulaire.php Jan. 15, 2019 (Year: 2019), 1 pg.‡

Mazur, Richard; Notice of Allowance for U.S. Appl. No. 29/796,646, filed Jun. 25, 2021, dated Jan. 10, 2022, 14 pgs.‡

Mazur, Richard; Final Office Action for U.S. Appl. No. 16/752,538, filed Jan. 24, 2020, dated May 28, 2021, 14 pgs.

Mazur, Richard; Non-Final Office Action for U.S. Appl. No. 16/752,538, filed Jan. 24, 2020, dated Nov. 8, 2021, 22 pgs.

Mazur, Richard; Non-Final Office Action for U.S. Appl. No. 16/752,538, filed Jan. 24, 2020, dated Feb. 16, 2021, 14 pgs.

Mazur, Richard; Requirement for Restriction/Election for U.S. Appl. No. 16/752,538, filed Jan. 24, 2020, dated Dec. 16, 2020, 8 pgs.

Like Steel Unlike Anything Else Western Window Systems https://www.westernwindowsystems.com/simulated-steel-line Jul. 2019 (Year: 2019).

Mazur, Richard; Final Office Action for Design U.S. Appl. No. 29/679,621, filed Feb. 7, 2019, dated Dec. 30, 2020, 6 pgs.

Mazur, Richard; Non-Final Office Action for Design U.S. Appl. No. 29/679,621, filed Feb. 7, 2019, dated Sep. 4, 2020, 12 pgs.

Mazur, Richard; Notice of Allowance for Design U.S. Appl. No. 29/679,621, filed Feb. 7, 2019, dated Mar. 24, 2021, 12 pgs.

Mazur, Richard; Final Office Action for U.S. Appl. No. 16/752,538, filed Jan. 24, 2020, dated Jan. 28, 2022, 13 pgs.

Mazur, Richard; Non-Final Office Action for U.S. Appl. No. 16/752,538, filed Jan. 24, 2020, dated Aug. 5, 2022, 25 pgs.

Mazur, Richard; Notice of Allowance for U.S. Appl. No. 16/752,538, filed Jan. 24, 2020, dated Nov. 16, 2022, 10 pgs.

* cited by examiner
‡ imported from a related application

SIMULATED STEEL FENESTRATION SYSTEM

CROSS-REFERENCE TO RELATED APPLICATIONS

The present application is a divisional of U.S. application Ser. No. 16/752,538, filed Jan. 24, 2020, which claims priority to U.S. Provisional Application No. 62/802,507, filed Feb. 7, 2019, both of which are hereby specifically incorporated by reference herein in their entireties.

TECHNICAL FIELD

This disclosure relates to fenestration. More specifically, this disclosure relates to a fenestration system comprising simulated steel elements.

BACKGROUND

Fenestration comprises doors and windows. A fenestration system often comprises a frame and a glass pane assembly. The glass pane assembly can comprise one or more glass panes. Some glass panes can comprise multiple lites, which can be supported by muntin bars. Other fenestration systems can comprise muntin bars that are decorative only and can give the appearance of multiple lites (known as simulated divided lites, or SDLs) to a continuous glass pane.

It can be desirable to form various elements of the fenestration system, such as the frame and the muntin bars, out of steel for visual effect. However, steel can be expensive, can require a lengthy manufacturing lead time, and can require field glazing, which can increase installation time and labor costs.

Furthermore, gaps between the glass pane assembly and the frame can allow for convection (i.e., heat transfer) from a first side of the fenestration system to a second side; for example, from the outside of a building to the inside of the building. Common solutions for reducing convection include filling open gaps with a silicone sealant or a foam material. These processes can be expensive, visually unappealing, and can slow the assembly process. Another common solution is to minimize tolerances between the frame and the glass pane assembly. However, this can increase the likelihood of breaking the glass pane(s) during assembly.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts off the disclosure as an introduction to the following complete and extensive detailed description.

Disclosed is simulated steel fenestration system comprising a frame; a pane assembly assembled with the frame; and a muntin bar, wherein at least one of the frame and the muntin bar comprise a non-steel material configured to resemble steel.

Also disclosed is an insulated fenestration system comprising a frame comprising a first bracket, the first bracket defining a sealing slot; a pane assembly assembled with the frame, the pane assembly comprising a first pane; a bracket gap defined between the first bracket and the first pane; and a first seal engaging the sealing slot, the first seal extending across the bracket gap and abutting the first pane.

A method for insulating a fenestration system is also disclosed, the method comprising providing a frame, the frame comprising a first bracket, the first bracket defining a sealing slot; engaging a connector portion of a seal with the sealing slot; assembling a pane assembly with the frame, the pane assembly comprising a first pane, wherein a bracket gap is defined between the first bracket and the first pane; and extending an extension portion of the seal across the bracket gap to abut an outer pane surface of the first pane.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
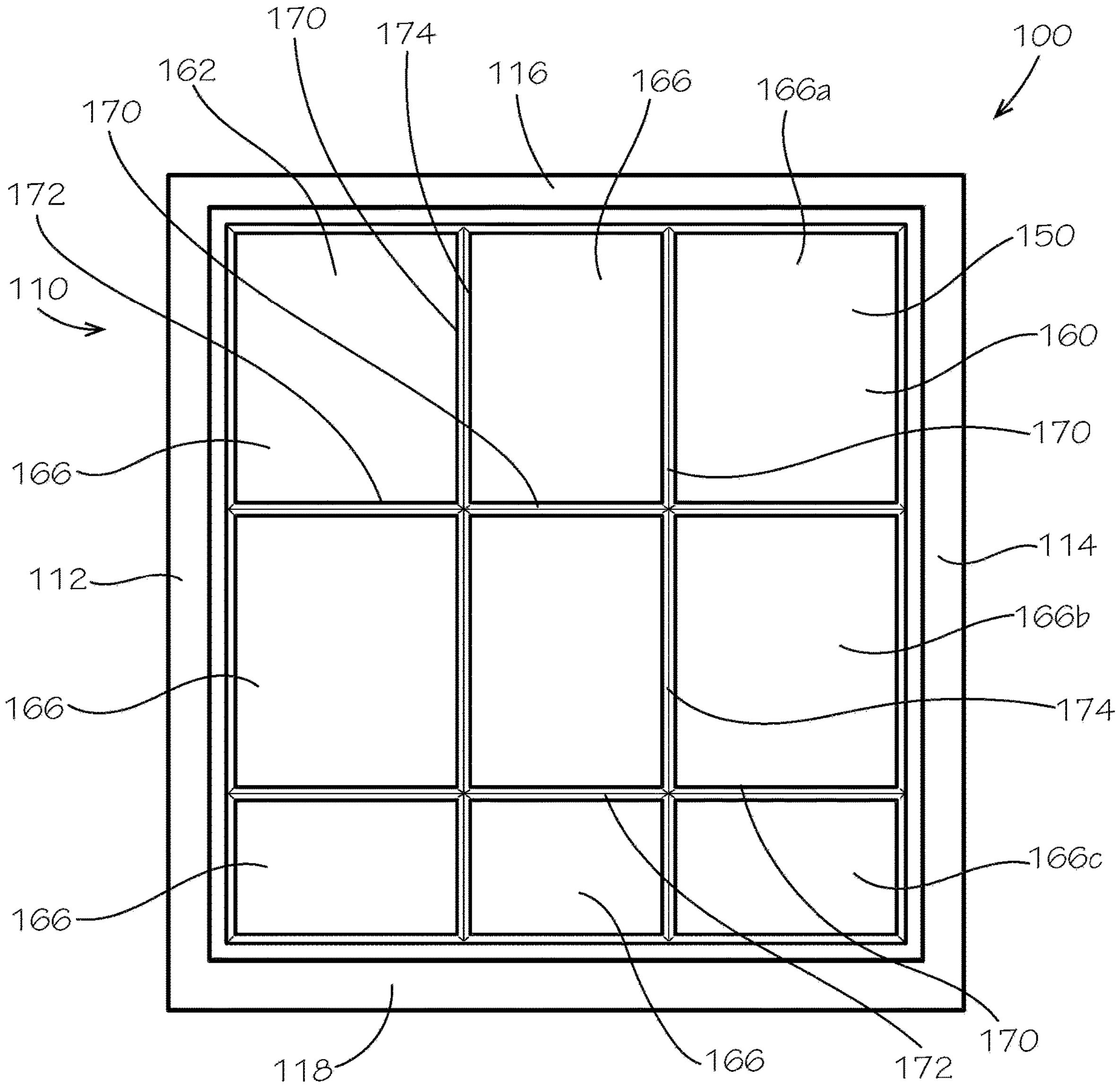
FIG. 1 is a front view of a fenestration system comprising a frame and an insulating glass unit, in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure.

It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed in the present application is a fenestration system and associated methods, systems, devices, and various apparatus. Example aspects of the fenestration system can comprise a frame and a pane assembly. Some aspects can further comprise least one muntin bar. Portions of the frame and/or muntin bar can comprise a non-steel material configured to resemble steel. It would be understood by one of skill in the art that the disclosed fenestration system is described in but a few exemplary aspects among many. No particular terminology or description should be considered limiting on the disclosure or the scope of any claims issuing therefrom.

FIG. 1 illustrates a first aspect of a fenestration system 100 according to the present disclosure. As shown, the fenestration system 100 can comprise a frame 110, a pane assembly 150, and a plurality of outer muntin bars 170 and inner muntin bars 280 (shown in FIG. 2). Example aspects of the pane assembly 150 can comprise multiple panes, such as a first pane and a second pane, which can be rectangular in shape in some aspects. For example, the pane assembly 150 can be a glass pane assembly comprising multiple glass panes. For example, in the present aspect, the glass pane assembly can be an insulating glass unit 160 (IGU) comprising an outer pane, such as an outer glass pane 162, and an inner pane, such as an inner glass pane 263 (shown in FIG. 2). The frame 110 can define a first frame side such as a left frame side 112, an opposite second frame side such as a right frame side 114, a first frame end such as top frame end 116, and an opposite second frame end such as a bottom frame end 118.

In the present aspect, the outer muntin bars 170 can comprise a pair of horizontal outer muntin bars 172 extending generally horizontally, relative to the orientation shown, between the left frame side 112 and the right frame side 114, and a pair of vertical outer muntin bars 174 extending generally vertically, relative to the orientation shown, between the top frame end 116 and the bottom frame end 118. The inner muntin bars 280 can similarly comprise a pair of horizontal inner muntin bars 282 (shown in FIG. 2) and a pair of vertical inner muntin bars 284 (shown in FIG. 2). Other aspects can comprise more or fewer outer and/or inner muntin bars 170, 280. Further, in other aspects, the outer and inner muntin bars 170, 280 can be arranged in any other suitable orientation. In still other aspects, the fenestration device can comprise outer muntin bars 170 only or inner muntin bars 280 only. Moreover, in some aspects, some or all of the outer muntin bars 170 and/or inner muntin bars 280 can be segmented into a plurality of muntin bar segments, as described in further detail below with respect to FIG. 2.

According to example aspects, each of the outer glass pane 162 and inner glass pane 263 can comprise a singular pane of glass, and the outer and inner muntin bars 170, 280, respectively, can be attached thereto for decorative purposes and to give the appearance of multiple lites (i.e. to define simulated divided lites 166, or SDLs). In other aspects, one or both of the outer glass pane 162 and inner glass pane 263 can comprise multiple lites and the muntin bars can be configured to support the lites.

Various elements of the fenestration system 100 can comprise a non-steel material configured to simulate a steel material. For example, various elements can comprise an aluminum extrusion, which can be treated to resemble steel. In the present aspect, the outer and inner muntin bars 170, 280 and the frame 110, or portions thereof, can each be shaped to resemble the form of steel glazing. A benefit of forming various elements from non-steel materials configured to simulate steel, such as aluminum, can be lower material and manufacturing costs when compared to steel itself. Additional benefits can be reduced manufacturing and assembly times and reduced labor costs.

Figure 2:
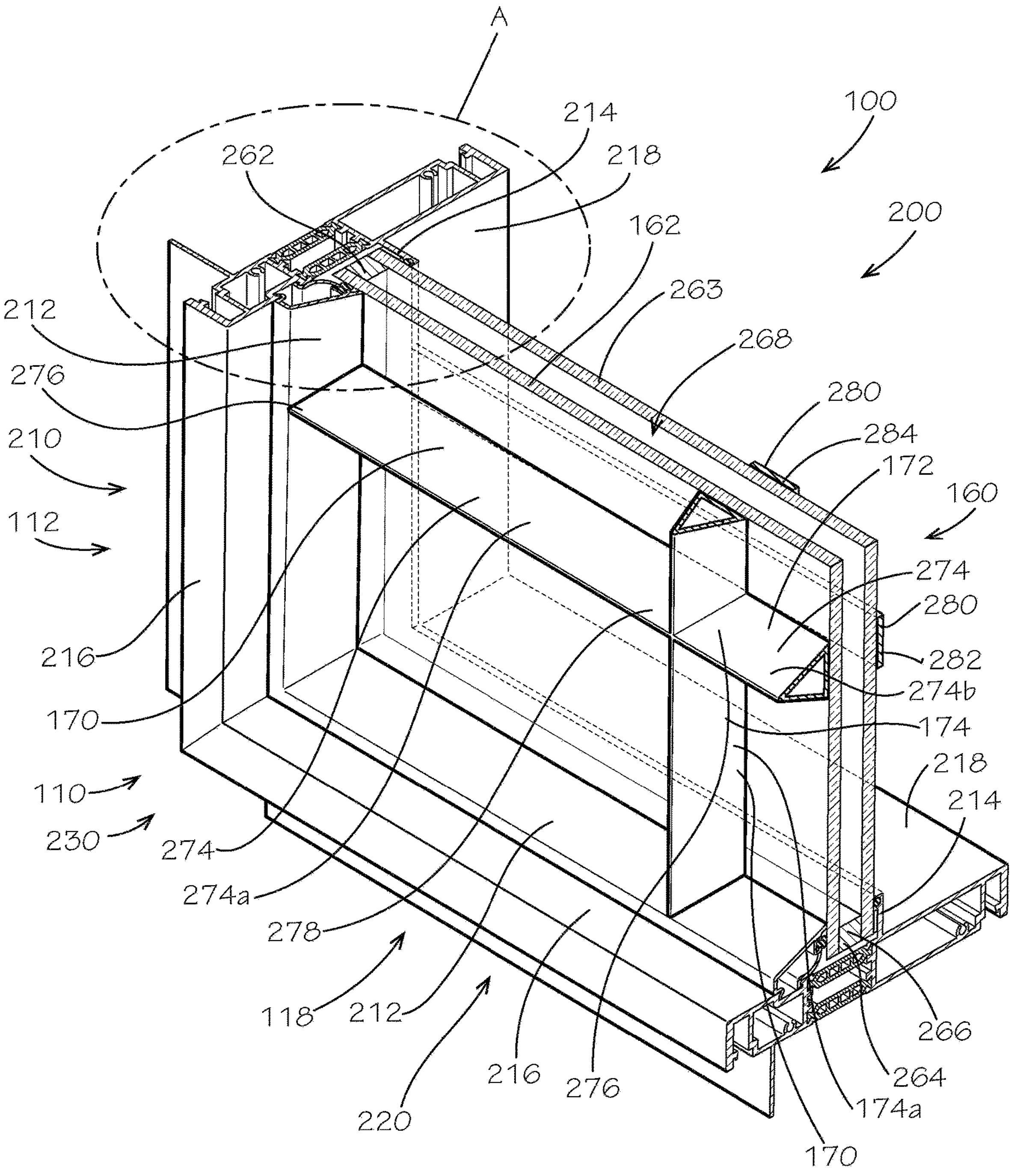
FIG. 2 is a top perspective cutaway view of a bottom left section of the fenestration system of FIG. 1.

FIG. 2 illustrates a cutaway view of a bottom left section 200 of the fenestration system 100. As shown, the outer glass pane 162 and inner glass pane 263 be spaced apart by a spacer 266 and can define a space 268 therebetween sealed with glazing, which can aid in reducing convection (i.e. heat transfer) across the fenestration system 100. Example aspects of the insulating glass unit 160 can define a first side edge such as a left side edge 262, an opposite second side edge such a right side edge (not shown), a first end edge such as top end edge (not shown), and a second end edge such as a bottom end edge 264. Each of the left side edge 262, right side edge, top end edge, and bottom end edge 264 of the insulating glass unit 160 can be substantially similar. In the present FIG. 2, the bottom left section 200 of the fenestration system 100 is illustrated, such that portions of the left frame side 112 and bottom frame end 118 of the frame 110 are visible and portions of the left side edge 262 and bottom end edge 264 of the insulating glass unit 160 are visible.

According to the present aspect, each of the left frame side 112, right frame side 114 (shown in FIG. 1), top frame end 116 (shown in FIG. 1), and bottom frame end 118 of the frame 110 can be substantially similar. Referring to the left frame side 112, the left frame side 112 can comprise a left frame body 210, a first bracket (e.g., an outer bracket 212), and a second bracket (e.g., an inner bracket 214). In the present aspect, the outer bracket 212 can be a glazing bead attached to the left frame body 210 by an engagement mechanism 314 (shown in FIG. 3), and the inner bracket 214 can be monolithically formed with the left frame body 210. In other aspects, either or both of the first and second brackets 126, 128 can be monolithically formed with the main frame body 120 or can be separately formed from the main frame body 120 and attached thereto. The outer and inner bracket 212, 214 can extend substantially along a length of the left frame body 210. According to example aspects, the left side edge 262 of the insulating glass unit 160 can be clamped between the outer bracket 212 and the inner bracket 214. For example, the outer bracket 212 can engage the outer glass pane 162 proximate the left side edge 262 and the inner bracket 214 can engage the inner glass pane 263 proximate the left side edge 262. Each of the right frame side 114 (shown in FIG. 1), top frame end 116 (shown in FIG. 1), and bottom frame end 118 can comprise similar outer and inner brackets 212, 214 configured to engage the corresponding right side edge (not shown), top end edge (not shown), and bottom end edge 264 of the insulating glass unit 160, respectively. For example, in the present FIG. 2, a bottom frame body 220 and the outer and inner brackets 212, 214 of the bottom frame end 118 are also visible. The left frame body 210 and bottom frame body 220, together with a right frame body (not shown) of the right side frame 114 and a top frame body (not shown) of the top end frame 116, can define a main body 230 surrounding the insulating glass unit 160.

The left frame body 210 of the left frame side 112 can further comprise an outer border portion 216 adjacent the outer bracket 212 and an inner border portion 218 adjacent the inner bracket 214. The right frame side 114, top frame end 116, and bottom frame end 118 can each define substantially similar outer border and inner border portions 216, 218 to provide the appearance of a continuous outer border and a continuous inner border surrounding a periphery of the insulating glass unit 160.

The outer muntin bars 170 can be attached to the outer glass pane 162, and the inner muntin bars 280 can be attached to the inner glass pane 263, as shown. In example aspects, the outer and inner muntin bars 170, 280 can be attached to the insulating glass unit 160 by a fastener (not shown), such as, for example, an adhesive, such as double-sided tape. In other aspects, the outer and inner muntin bars 170, 280 can be attached to the insulating glass unit 160 by any other suitable fastener, including, for example, glue, screws, welding, or the like. As illustrated, each of the outer muntin bars 170 can define a substantially triangular cross-section, and each of the inner muntin bars 280 can define a substantially rectangular cross-section. In the present aspect, the rectangular cross section of the inner muntin bars 280 can be relatively narrow. In other aspects, however, the outer and/or inner muntin bars 170, 280 can define any other suitable cross-sectional shape and can be any suitable size.

Referring to the outer muntin bars 170, in the present aspect, each of the vertical outer muntin bars 174 can extend continuously from the top frame end 116 (shown in FIG. 1) to the bottom frame end 118. Each of the horizontal outer muntin bars 172 can comprise multiple muntin bar segments 274, such that each of the horizontal outer muntin bars 172 can define a break at each intersection with a vertical outer muntin bar 174. In some aspects, as shown, the muntin bar segments 274 can be formed and arranged to provide the appearance of continuous horizontal outer muntin bars 172. In other aspects, the horizontal outer muntin bars 172 can be continuous, and the vertical outer muntin bars 174 can be segmented. According to example aspects, the inner muntin bars 280 can be configured in the substantially the same manner.

Each of the muntin bar segments 274 of the horizontal outer muntin bars 172 can define a first end 276 and a second end 278. Referring specifically to a first muntin bar segment 274*a*, the first muntin bar segment 274*a* can extend between the outer bracket 212 of the left frame side 112 and a first vertical outer muntin bar 174*a*. The first end 276 can be orientated at the outer bracket 212, and the second end 278 can be oriented at the first vertical outer muntin bar 174*a*. In some aspects, the first and/or second ends 276, 278 can be coupled to the outer bracket 212 and/or the first vertical outer muntin bar 174*a*, respectively. Furthermore, one or both of the first end 276 and second end 278 can be contoured to substantially match the profile of the outer bracket 212 and the first vertical outer muntin bar 174*a*, respectively.

The first and second ends 276, 278 of the other muntin bar segments 274 can also be contoured to match the profile of adjacent elements. For example, as shown in FIG. 2, the first end 276 of a second muntin bar segment 274*b* is also contoured to match the profile of the first vertical outer muntin bar 174*a*. As such, each of the horizontal outer muntin bars 172 can appear unbroken where the muntin bar segments 274 meet the corresponding vertical outer muntin bars 174. The horizontal outer muntin bars 172 can also cohesively join with the corresponding outer brackets 212 due to the matching contour, which can provide an attractive visual appearance. Again, the inner muntin bars 280 can be configured in the substantially the same manner.

Figure 3:
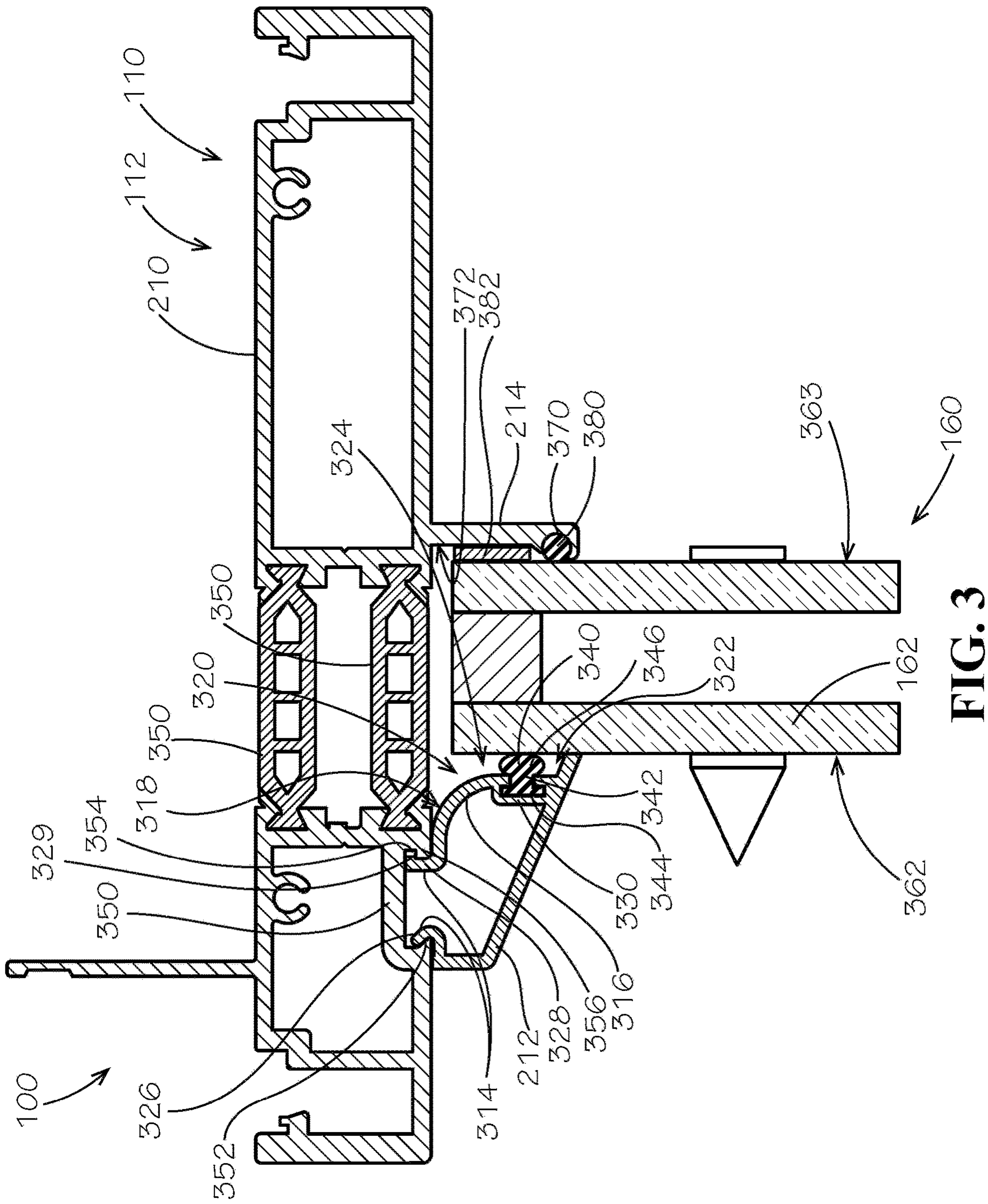
FIG. 3 is a top view of Section A of FIG. 2.

FIG. 3 illustrates a top view of Section A of FIG. 2, wherein the insulating glass unit 160 is engaged by the outer and inner brackets 212, 214. As shown, in the present aspect, an outer bracket gap 320 can be present between the outer glass pane 162 and an interior wall 316 of the outer bracket 212. The outer bracket gap 320 can extend substantially along a length of the interior wall 316. The outer bracket 212 can define a sealing slot 330 formed in an outer surface 318 of the interior wall 316, and the sealing slot 330 can extend substantially along a length of the interior wall 316. In the present aspect, the sealing slot 330 can define a T-shaped cross-section. However, in other aspects the sealing slot 330 can define any other suitable cross-sectional shape.

According to example aspects, a portion of a first seal 340 can be received in the sealing slot 330. The first seal 340 can be a bulb seal 342, as shown, a fin seal, a wedge seal, or any other suitable type of seal or weather stripping known in the art. In the present aspect, the first seal 340 can be formed from ethylene propylene diene monomer rubber (EPDM). In other aspects, the first seal 340 can be formed from another rubber, vinyl, a thermoplastic elastomer (TPE/TPS), polyvinyl chloride (PVC), foam, felt, or any other suitable material or combination of materials known in the art. Each of the right frame side 114 (shown in FIG. 1), top frame end 116 (shown in FIG. 1), and bottom frame end 118 (shown in FIG. 1) can be substantially similar to the left frame side 112, and can define a similar sealing slot 330 and first seal 340 engaged therewith.

Example aspects of the first seal 340 can define a connector portion 344 received in the sealing slot 330 and an extension portion extending outwards from the connector portion 344 towards the outer glass pane 162 of the insulating glass unit 160. According to example aspects of the bulb seal 342, the extension portion can be a bulb portion 346. In example aspects, as shown, the bulb portion 346 of the bulb seal 342 can extend fully across the outer bracket gap 320 between the interior wall 316 and the insulating glass unit 160 and can touch or abut an outer pane surface 362 of the outer glass pane 162. In some aspects, the first seal 340 can be compressed between the outer bracket 212 and the insulating glass unit 160, such that the first seal 340 can exert a force on the outer bracket 212 and the outer glass pane 162. As such, in some aspects, the first seal 340 can comprise a compressible material. The first seal 340 can also extend substantially along the length of the sealing slot 330, which in some cases can be substantially along the length of the interior wall 316. In other aspects, the first seal 340 may not extend fully across the outer bracket gap 320 and/or fully along the length of the left frame body 210.

According to example aspects, the first seal 340 can extend fully across the bracket gap 320 to divide the outer bracket gap 320 into a first gap portion 322 and a second gap portion 324. Air received in the first gap portion 322 can be prevented from entering the second gap portion 324 by the first seal 340, and vice versa. This can provide the benefit of preventing the transfer of hot and/or cold air across the first seal 340, thus insulating the fenestration system 100 at the outer bracket 212. The force exerted by the compressed first seal 340 on the outer glass unit can be great enough to prohibit the transfer of air in between the first seal 340 and the outer glass pane 162, but minor enough to create minimal stress on the outer glass pane 162. The seals 340 of the right frame side 114, top frame end 116, and bottom frame end 118 can similarly prevent the transfer of hot and/or cold air between the corresponding first and second gap portions 322, 324. As such, a substantially air-proof seal can be created fully around a perimeter of the insulating glass unit 160 for reducing convection across the fenestration system 100. Example aspects of the frame 110 can further comprise insulating bars 350, as shown, for further thermally insulating the fenestration system 100.

Example aspects of the inner bracket 214 can define a sealing channel 370 formed in an interior wall 372 thereof. The sealing channel 370 can extend substantially along a length of the interior wall 372. In the present aspect, the sealing channel 370 can define a substantially circular cross sectional shape. However, in other aspects the sealing channel 370 can define any other suitable cross-sectional shape. According to example aspects, a second seal 380 can be received in the sealing channel 370. The second seal 380 can be a glazing seal, as shown. In a particular aspect, the glazing seal can be chord stock. In other aspects, the second seal 380 can be a gasket, bulb seal, a fin seal, wiper seal, a wedge seal, or any other suitable type of seal or weather stripping known in the art. Example aspects of the second seal 380 can be formed from ethylene propylene diene monomer rubber (EPDM) another rubber, vinyl, a thermoplastic elastomer (TPE/TPS), polyvinyl chloride (PVC), foam, felt, or any other suitable material or combination of materials known in the art. Each of the right frame side 114 (shown in FIG. 1), top frame end 116 (shown in FIG. 1), and bottom frame end 118 (shown in FIG. 1) can be similarly define a sealing channel 370 formed in the inner bracket 214 thereof, and a second seal 380 received therein.

According to example aspects, a portion of the second seal 380 can be received in the sealing channel 370 and another portion of the second seal 380 can extend outwards from the sealing channel 370 towards the inner glass pane 263 of the insulating glass unit 160. In example aspects, as shown, the second seal 380 can touch or abut an outer pane surface 363 of the inner glass pane 263. Furthermore, in some aspects, the second seal 380 can be compressed between the inner bracket 214 and the insulating glass unit 160, such that the second seal 380 can exert a force on the inner bracket 214 and the inner glass pane 263. As such, each of the first seal 340 and second seal 380 can apply a force to the outer glass pane 162 and inner glass pane 263, respectively, to sandwich the insulating glass unit 160 between the first and second seals 340, 380. Similar to the first seal 340, the second seal 380 can also provide the benefit of preventing the transfer of hot and/or cold air across the second seal 380. Some aspects of the fenestration system can further comprise a third seal 382 compressed between the interior wall 372 of the inner bracket 214 configured to further reduce convection.

Example aspects of the engagement mechanism 314 of the outer bracket 212 can be configured to engage a mating engagement mechanism 350 of the left frame body 210, as shown. In the present aspect, the engagement mechanism 314 can define a first prong 326 and a second prong 328. The first prong 326 can be configured to engage a ramped engagement surface 352 of the mating engagement mechanism 350. The second prong 328 can define a tab 329 configured to engage a tab recess 354 of the mating engagement mechanism 350. In some aspects, the outer bracket 212, or portions thereof, can be formed from a resilient material. For example, in a particular aspect, the second prong 328 can be formed from a resilient material, which can allow the second prong 328 to flex.

In one aspect, to attach to the outer bracket 212 to the left frame body 210, the first prong 326 of the engagement mechanism 314 can be inserted into the mating engagement mechanism 350 and can engage the ramped engagement surface 352. The outer bracket 212 can be rotated towards the insulating glass unit 160 until the second prong 328 is adjacent to a projection 356 of the left frame body 210. A force can be applied to the outer bracket 212 to press the second prong 328 against the projection 356. The second prong 328 can flex to allow the second prong 328 to slide past the projection 356 and into the mating engagement mechanism 350. An angled surface 429 (shown in FIG. 4) of the tab 329 can facilitate sliding the second prong 328 past the projection 356. Once received within the mating engagement mechanism 350, the tab 329 can be aligned with the tab recess 354, and the resiliency of the second prong 328 can bias the tab 329 into the tab recess 354 to secure the outer bracket 212 to the left frame body 210. Furthermore, as shown, the first seal 340 can be compressed between the outer bracket 212 and the insulating glass unit 160 when the outer bracket 212 is secured to the left frame body 210.

Figure 4:
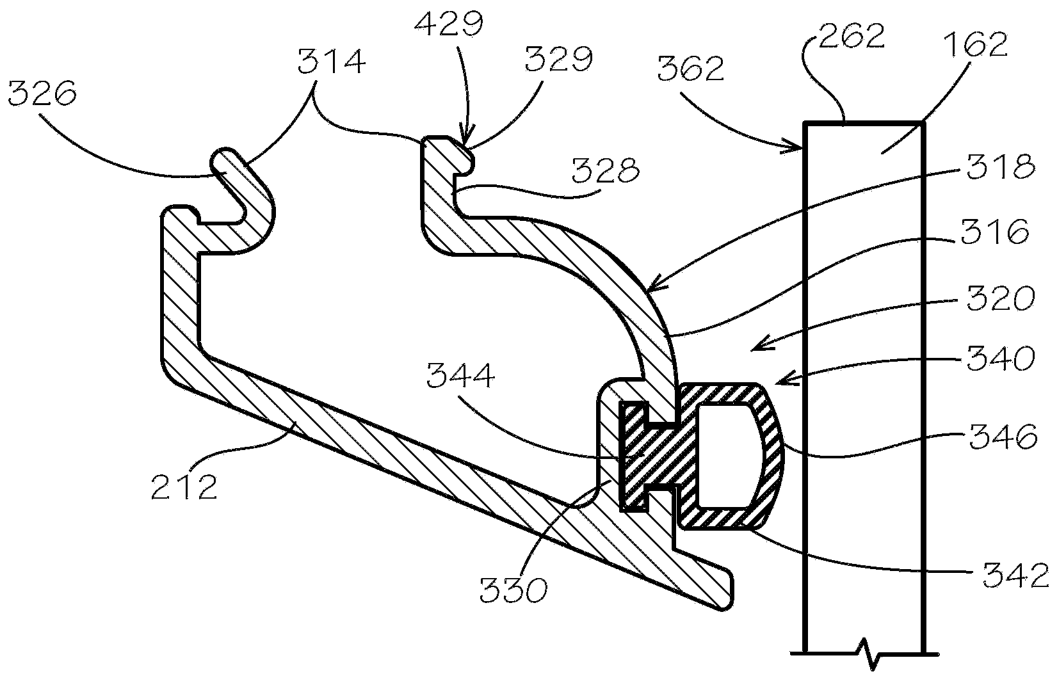
FIG. 4 is a detail top view of a seal of the fenestration system of FIG. 1 in an uncompressed configuration.
Figure 5:
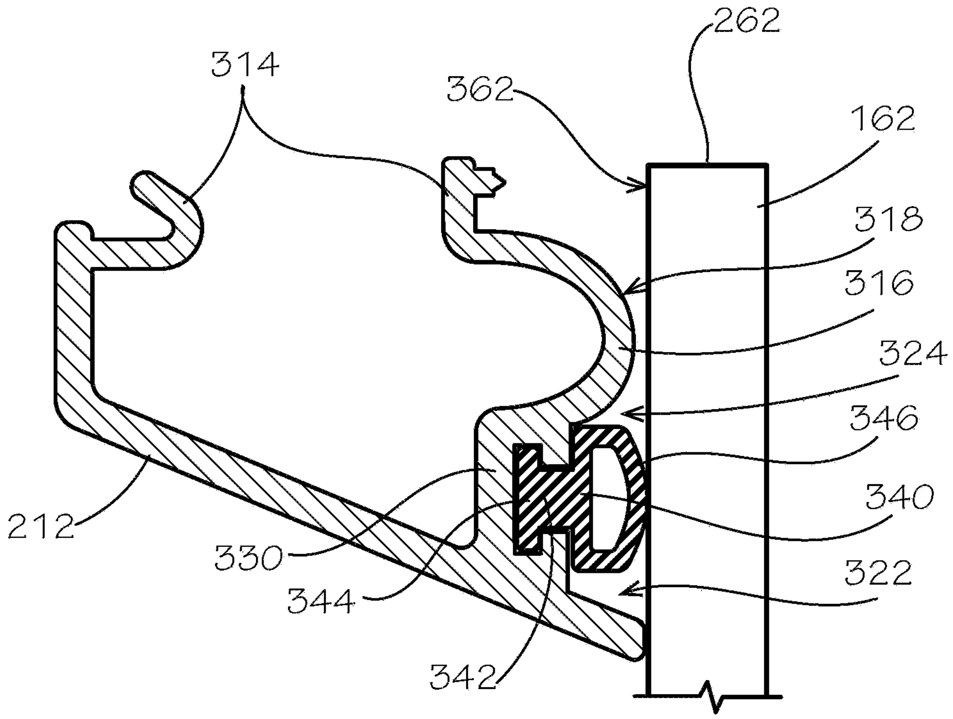
FIG. 5 is a detail top view of the seal of FIG. 4 in a compressed configuration.
Figure 6:
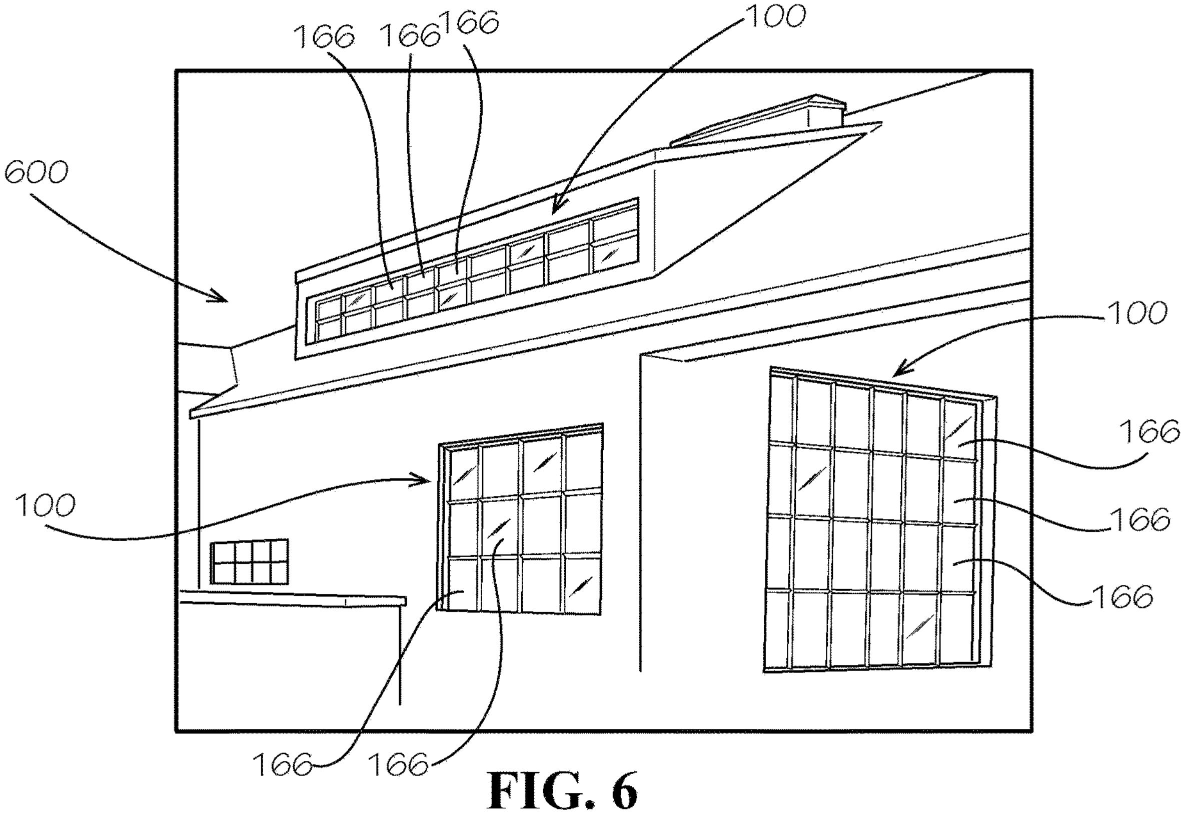
FIG. 6 is a perspective view of various aspects of the fenestration system installed in a building.
Figure 7:
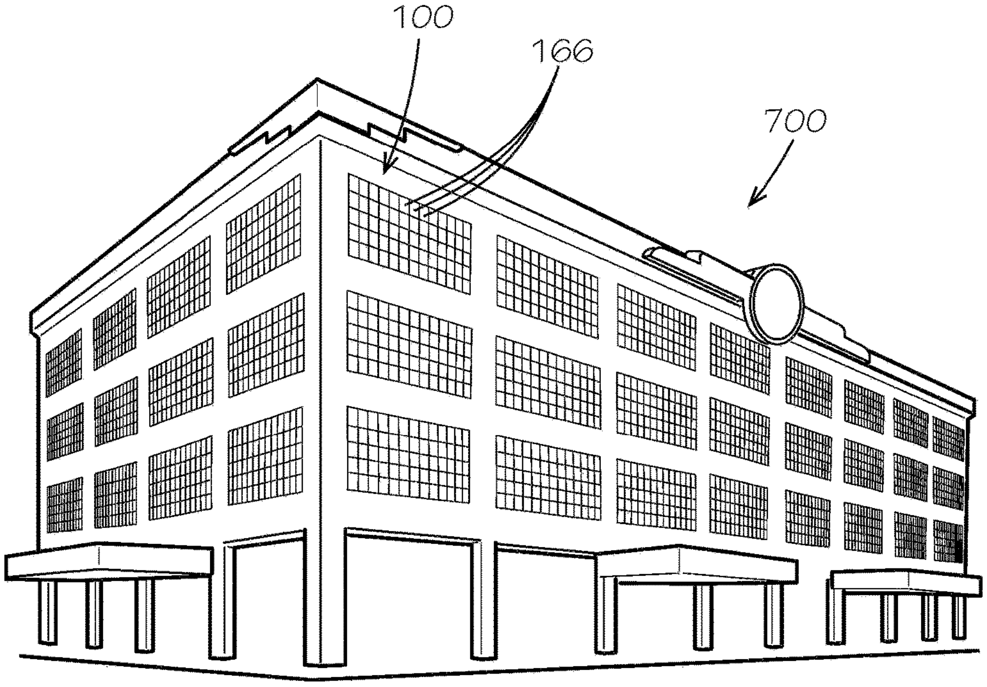
FIG. 7 is a perspective view of various aspects of the fenestration system installed in a building.
Figure 8:
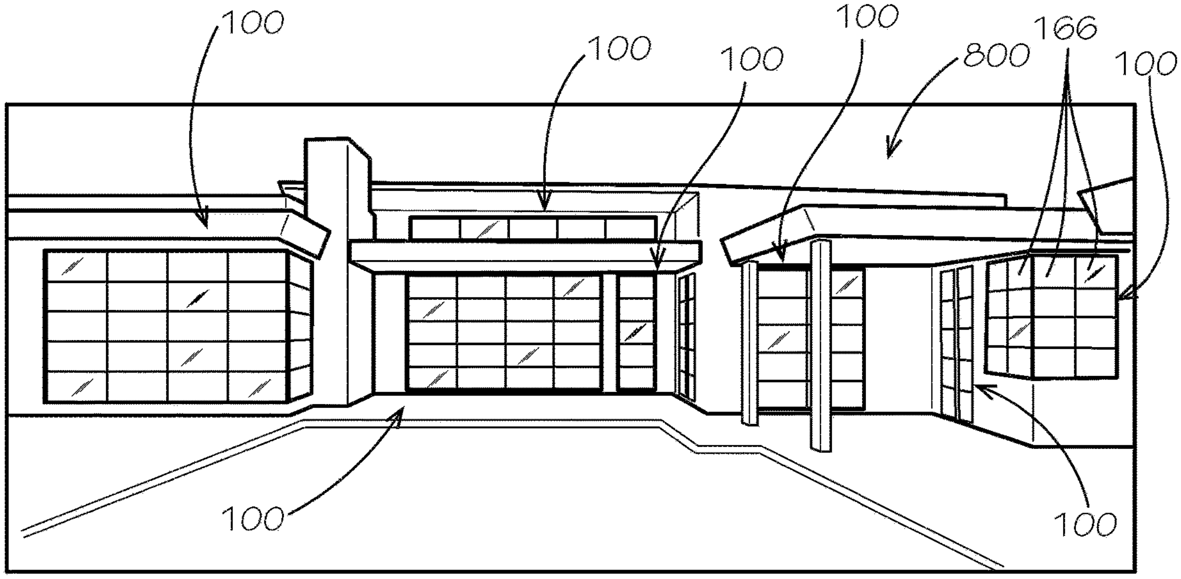
FIG. 8 is a front view of various aspects of the fenestration system installed in a building.
Figure 9:
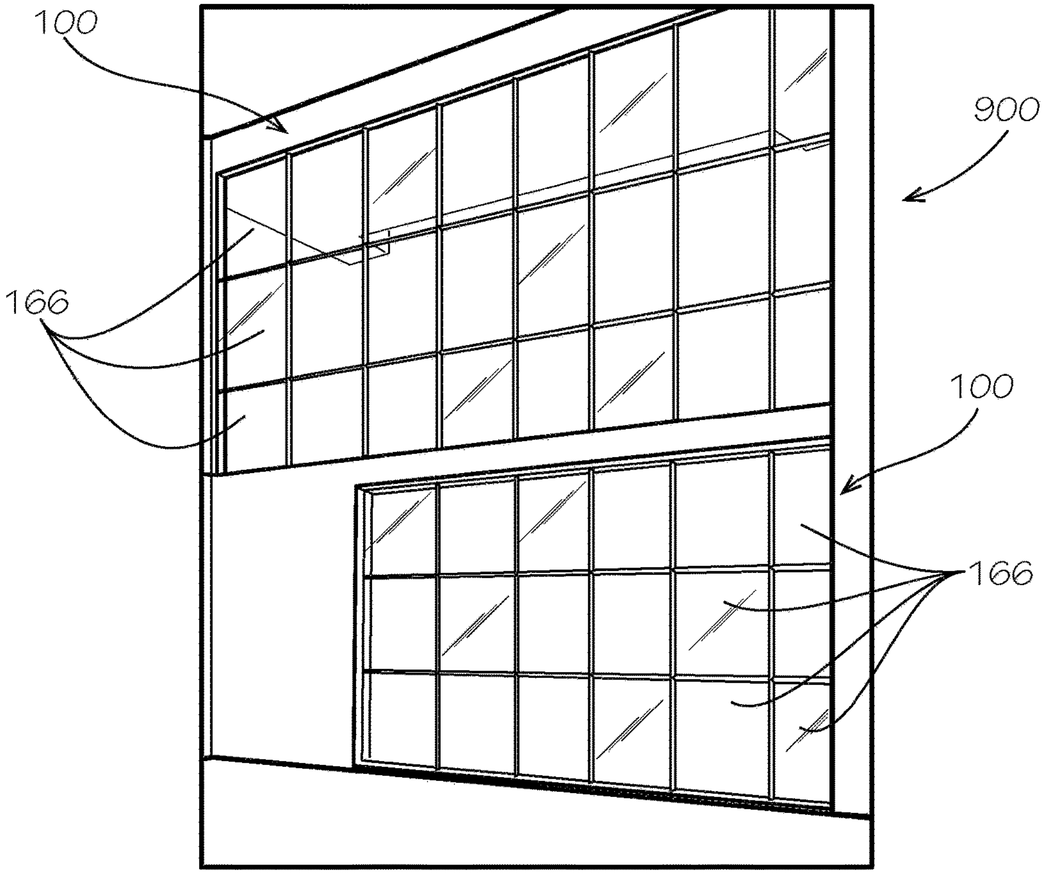
FIG. 9 is a perspective view of various aspects of the fenestration system installed in a building.

FIGS. 4 and 5 illustrate the first seal 340 before and after, respectively, compression between the outer bracket 212 and the outer glass pane 162. As shown in FIG. 5, in some aspects, the interior wall 316 of the outer bracket 212 can deform under the force exerted by the first seal 340 when the fenestration system 100 is assembled. FIGS. 6-9 illustrate various other aspects of the fenestration system 100 installed in buildings 600, 700, 800, 900, respectively. As shown, the size of the fenestration system 100 can vary. Furthermore, the size of the simulated divided lites 166 (or actual lites, in some instances) can vary. The ratio of the size of the simulated divided lites 166 to the size of the fenestration system 100 can vary, as well. For example, a 20"×12" fenestration system 100 can comprise twenty 4"×3" simulated divided lites 166 in one aspect. In another aspect, the 20"×12" fenestration system 100 can comprise twelve 5"×4" simulated divided lites 166.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments 274, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. An insulated fenestration system comprising:

a frame comprising a frame body, a first bracket, and a second bracket, the frame body comprising a first frame body and a second frame body, the first bracket defining a sealing slot and an engagement mechanism, the engagement mechanism coupling the first bracket to the first frame body;

a pane assembly assembled with the frame and clamped between the first bracket and the second bracket, the pane assembly comprising a first pane and a second pane, an outer surface of the first bracket defines a sloped front surface extending away from the first pane;

a bracket gap defined between the first bracket and the first pane;

a first seal engaging the sealing slot, the first seal extending across the bracket gap and abutting the first pane;

an insulating bar extending between the first frame body and the second frame body, an unobstructed elongated channel extending through and encompassed by the insulating bar; and a muntin bar attached to the first pane, the muntin bar defining an angled end, the angled end abutting and matching an angle of the sloped front surface, the first bracket extends around a perimeter of the first pane so as to include a top bracket extending along a top end of the first pane, a bottom bracket extending along a bottom end of the first pane, a left bracket extending along a left side of the first frame, and a right bracket extending along a right side of the first frame, and the muntin bar one of:

extends between and to the top bracket and the bottom bracket and is spaced apart from the left bracket and the right bracket; or extends between and to the left bracket and the right bracket and is spaced apart from the top bracket and the bottom bracket;

wherein the second bracket is substantially planar and comprises an interior wall and an exterior wall opposite the interior wall, the second bracket oriented substantially parallel to the pane assembly, the second bracket formed monolithically with the second frame body and extending along an outer pane surface of the second pane, the interior wall facing the outer pane surface; and wherein the second frame body defines a perpendicular frame portion oriented substantially perpendicular to the substantially planar second bracket, the perpendicular frame portion extending in a direction outward and away from the interior wall of the second bracket and the outer pane surface of the second pane, the perpendicular frame portion extending from the second bracket adjacent to a side edge of the pane assembly.

2. The insulated fenestration system of claim 1, wherein the engagement mechanism defines a first prong and a second prong, each of the first and second prongs engaging the frame.

3. The insulated fenestration system of claim 2, wherein the first prong extends in a first direction away from the second prong, and wherein the second prong extends in a second direction away from the first prong.

4. The insulated fenestration system of claim 3, wherein the first direction is substantially opposite the second direction.

5. The insulated fenestration system of claim 2, wherein:
the first prong engages a ramped engagement surface of the first frame body; and
the second prong comprises a tab engaging a tab recess of the first frame body.

6. The insulated fenestration system of claim 5, wherein:
the first seal comprises a connector portion and an extension portion;
the extension portion disposed at a first distance away from the first frame body; and
the first bracket extends a second distance away from the first frame body, wherein the second distance is at least equal to the first distance.

7. The insulated fenestration system of claim 2, wherein the sealing slot is disposed between the first prong and the second prong.

8. The insulated fenestration system of claim 1, wherein:
the first seal is a bulb seal comprising a connector portion and an extension portion extending from the connector portion;
the connector portion engages the sealing slot; and
the extension portion extends across the bracket gap and abuts an outer pane surface the first pane.

9. The insulated fenestration system of claim 8, wherein the sealing slot defines a T-shaped cross-section and the extension portion of the bulb seal defines a substantially T-shaped cross-section.

10. The insulated fenestration system of claim 1, wherein the first bracket comprises an interior wall and the sealing slot extends substantially along a length of the interior wall of the first bracket.

11. The insulated fenestration system of claim 1, wherein the first seal divides the bracket gap into a first gap portion and a second gap portion.

12. The insulated fenestration system of claim 1, wherein:
the substantially planar second bracket defines a sealing channel;
the pane assembly comprises a second pane;
the insulated fenestration system further comprises a second seal; and
the second seal comprises a first portion received in the sealing channel and a second portion abutting the second pane, and the pane assembly is sandwiched between the first seal and the second seal.

13. The insulated fenestration system of claim 1, wherein: the outer surface of the first bracket further defines the sealing slot; the first seal defines a connector portion and an extension portion; and the connector portion engages the sealing slot.

14. The insulated fenestration system of claim 13, wherein the first bracket substantially covers an outer face of the extension portion facing outward from the first pane.

15. The insulated fenestration system of claim 14, wherein the sloped front surface extends to or past a side edge of the outer face.

16. The insulated fenestration system of claim 15, wherein the extension portion defines a width extending from a first side of the extension portion to a second side of the extension portion, and wherein the first bracket spans the width of the extension portion.

17. The insulated fenestration system of claim 1, wherein the sloped front surface is substantially planar.

18. The insulated fenestration system of claim 1, wherein the unobstructed elongated channel is one of a plurality of unobstructed elongated channels, the plurality of unobstructed elongated channels being parallel to one another and arranged in series laterally across the insulating bar, and each unobstructed elongated channel is separated from the other unobstructed elongated channels by an associated wall partition.

19. The insulated fenestration system of claim 1, further comprising:
a second seal compressed between the second pane and the second bracket; and
a third seal compressed between the second pane and the second bracket.

20. The insulated fenestration system of claim 1, wherein the muntin bar subdivides the first pane into a plurality of simulated lites, the first pane is a singular pane of glass, and the muntin bar is adhered to the first pane.

* * * * *